Oct. 26, 1926.

J. J. ANDREAS 1,604,142

PLANER ATTACHMENT

Filed Nov. 5, 1924   2 Sheets-Sheet 1

Inventor

John J. Andreas,

By

Attorneys

Oct. 26, 1926.  
J. J. ANDREAS  
1,604,142  
PLANER ATTACHMENT  
Filed Nov. 5, 1924  
2 Sheets-Sheet 2

Inventor  
John J. Andreas,  
By  
Attorneys

Patented Oct. 26, 1926.

1,604,142

UNITED STATES PATENT OFFICE.

JOHN J. ANDREAS, OF ALGONAC, MICHIGAN.

PLANER ATTACHMENT.

Application filed November 5, 1924. Serial No. 747,897.

This invention relates to a planer attachment and has special reference to a rotary planing instrumentality that may be used in connection with various types of planers or suitably driven to operate upon a surface to be planed or smoothed. For instance, in preparing plates or beds on which pieces of work are to be placed for careful workmanship and operations of precision, such plates or beds are ground or otherwise worked together until a uniform surface is obtained on one or more of the plates. It is now common practice to take three plates and number the same one, two and three. Plates one and two are placed together and ground face to face, then plates two and three similarly ground, then plates one and three, and so interchanging said plates until a surface is ground on said plates that is uniform and smooth throughout. This requires time and labor and my invention aims to accomplish the same result more expeditiously by a rotary planing instrumentality which will insure a uniform surface on a bed or plate after having been operated upon by the planer.

My invention, in its broadest aspect, involves a rotary planing instrumentality having a multiplicity of cutting tools arranged so that each tool has an individual action on a surface without gouging or disrupting the surface to such an extent as to preclude proper setting of the surface under the action of the tubes. The tools are arranged or disposed so that only a few of the tools are brought into action at one time but are adapted to be closely followed by others and in this manner a very large number of tools may cooperate in removing minute portions of a surface to be planed or smoothed, the planing or smoothing action being so gradual that the resultant surface is uniform throughout and just as level, if not more so, than a surface produced by face to face grinding.

My invention further aims to provide a rotary planing instrumentality composed of a plurality of heads, each provided with loosely mounted planing tools which will have somewhat of a beating action against a surface. The very fact that the tools are loosely mounted and capable of yielding permits the tools to yield before disrupting a surface to any appreciable extent. The beating action of the tools on the surface of the plate causes the plate to seat just as though its grain was made finer or its molecules more closely assembled, and it is under such action that an extremely fine, smooth and uniform surface is produced.

The construction entering into my invention will be hereinafter described and then claimed, and reference will now be had to the drawings, wherein—

Figure 1:
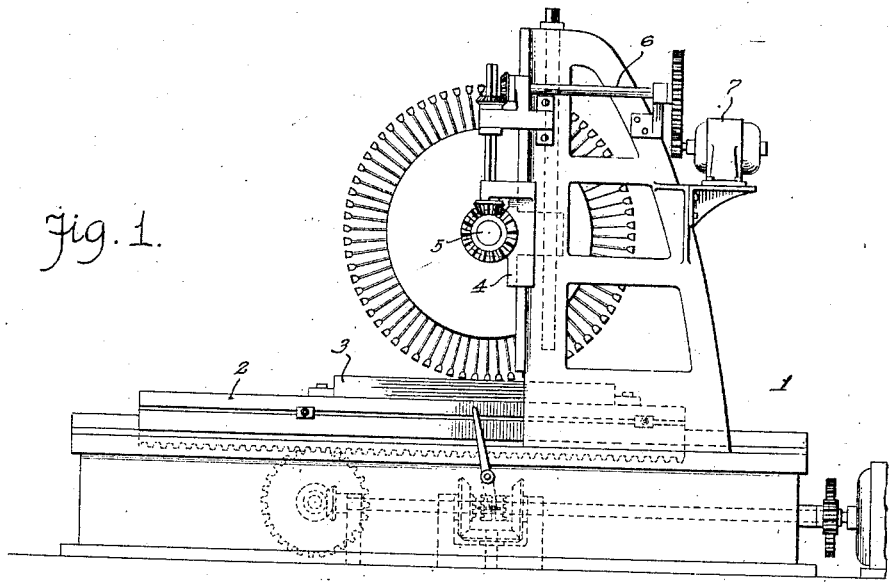
Figure 1 is a side elevation of a conventional form of planing machine provided with a rotary planing instrumentality in accordance with my invention.

In the drawings, the reference numeral 1 generally denotes a conventional form of planer as having a driven reciprocable carriage or work holder 2 adapted for supporting a plate 3 or other piece of work which is adapted to be attached to the carriage 2 so that its upper surface may be planed and finished. The planer also includes an adjustable bearing 4 for a driven shaft or arbor 5, said shaft being driven by a suitable power transmission mechanism 6 from an electric motor 7 or other suitable source of power. It is on the shaft or arbor 5 that my planing instrumentality may be mounted to operate upon the surface of the plate 3 as it is shifted by the carriage 2 of the machine.

The planing instrumentality comprises a plurality of hollow heads or drums 8 arranged side by side and suitably keyed or otherwise fixed, as at 9, on the shaft or arbor 5. The heads or drums are substantially alike in construction and I deem it only necessary to describe in detail the construction of one of said heads or drums.

Figure 4:
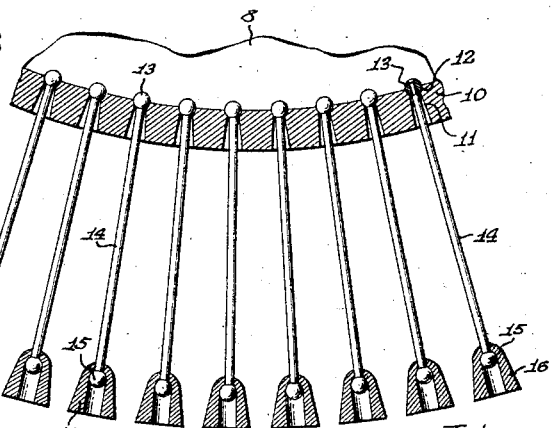
Fig. 4 is a longitudinal sectional view of a portion of the same.

The annular wall 10 of each drum is provided with a multiplicity of openings or sockets 11 which has the walls thereof tapering outwardly from the inner face of the wall 10 to the outer face thereof, as best shown in Fig. 4, and the inner end of each opening or socket is formed with a semispherical seat 12 for the inner spherical or globular head 13 of a tool stem 14 extending through the opening or socket 11, said stem having a similar head 15 on its outer end. One or the other of the heads 13 or 15 may be integral with the stem and with one of the heads detachable the tool stem can be placed in the opening or socket 11 and loosely retained therein, so that the stem may wobble or be self adjusting.

On the outer head 15 of the tool stem 14 is a bell shaped cutter or planing instrumentality 16 which is free to revolve about the axis of the stem 14, othewise being rigid except that it may shift inwardly on the stem should occasion require.

Figure 6:
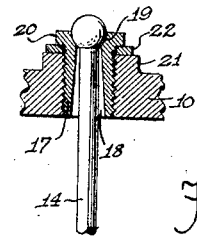
Fig. 6 is a detail sectional view of an adjustable tool socket.

Instead of mounting the tool stems 14 in the naked openings or sockets 11, I may make each opening cylindrical and screw-thread the walls thereof, as shown in Fig. 6. In such an opening a bushing 17 may be adjustably mounted, said bushing having a tapered bore 18 and a seat 19 similar to the opening 11 and the seat 12. The bushing 17 may be provided with a nut head 20 so that it may be easily adjusted and between this head and the boss 21 of the wall 10 one or more shims 22 may be placed so that the bushing may be adjusted relative to the wall 10 to support the tool stem 14 with its tool 16 a desired distance from the wall 10.

Figure 2:
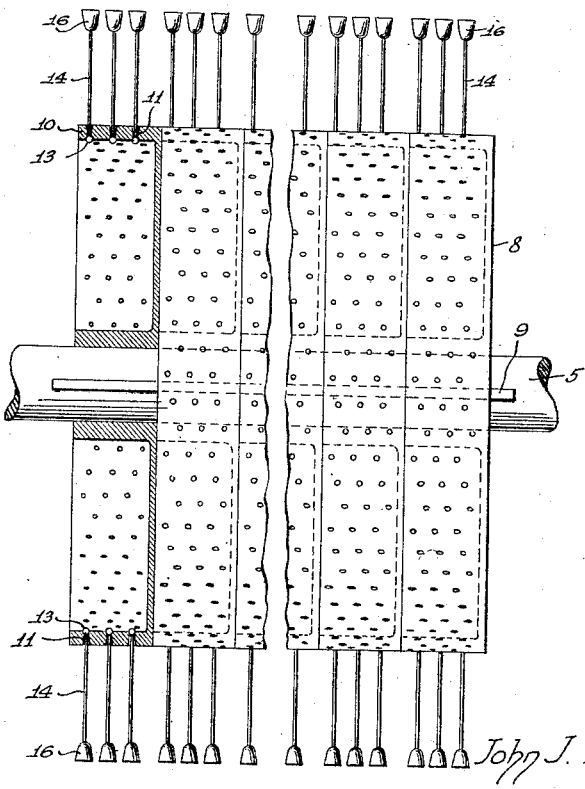
Fig. 2 is a front elevation of a planing instrumentality, partly broken away and partly in section.
Figure 7:
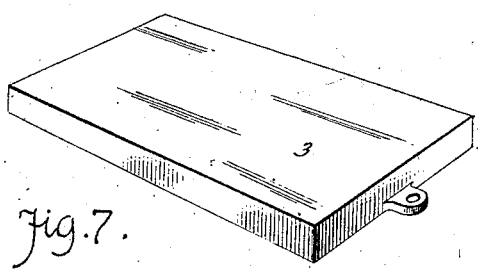
Fig. 7 is a perspective view of a plate or bed adapted to be prepared by a planer in accordance with my invention.
Figure 3:
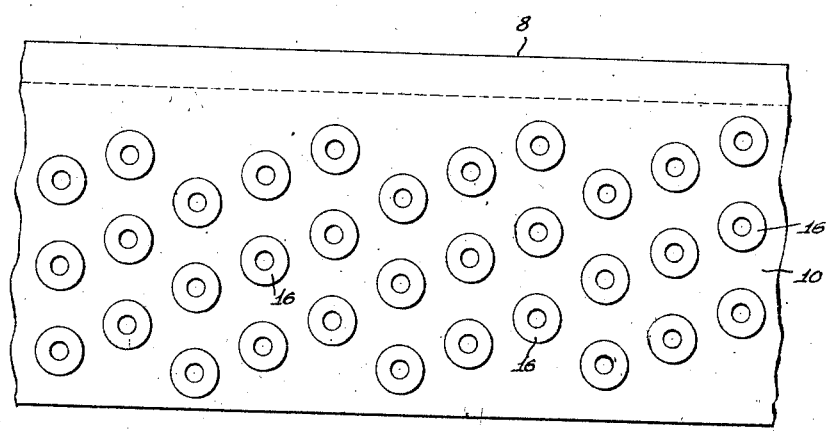
Fig. 3 is an enlarged plan of a portion of one of the tool supporting heads.
Figure 5:
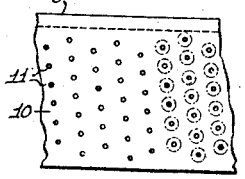
Fig. 5 is a view similar to Fig. 3, showing another way of disposing the tools on the head.

Considering Figs. 2, 3, and 5, it will be noted that the openings or sockets 11 are closely arranged and it is preferable to dispose said openings so that the cutters 16 will be staggered throughout the periphery of each head or drum 8. To this end, the openings may be considered in rows circumferentially and transversely of the wall 10. The circumferential rows may be in parallel planes at an angle to the plane of rotation of the head or drum 8 or said circumferential rows may be contiguous as a marginal spiral about the periphery of the head or drum. Considering the openings as transversely disposed rows, such rows may be at a right angle to the side edges or faces of the head or drum 8, or, as shown in Fig. 5, disposed at obtuse angles relative to the side edges or faces of the head or drum. With all of the openings closely assembled the purpose of such an arrangement is to at all times have one or more of the cutters 16 operating on the surface of the plate 3. Not too many of the cutters but a sufficient number are used to expeditiously surface the plate without gouging or excessively disrupting the surface.

Considering the rotary planing instrumentality in action, the centrifugal force set up by rotation retains the stems 14 and the cutters 16 normally distended in radial positions as shown in Fig. 1. As the cutters 16 are brought into engagement with the plate 3 there is somewhat of a beating or wiping action of said cutters on the surface and on account of said cutters being suspended at the lower side of each of the heads 8 it is obvious that the cutters are yieldably supported, may recede, and allow some other cutter to perform its work if indurate particles are encountered in the surface of the plate. In practice, the rotary planing instrumentality is set so that the multiplicity of cutters 16 will have a minimum cutting action relative to the plate 3, and particularly during the last passes of the plate 3 under the rotary planer. For the first few passes of the plate 3 the cutters may have a more pronounced cutting action but towards the end there is more of a wiping action, closely approaching a grinding result and it is in this manner that the entire surface of the plate 3 can be operated upon until it is perfectly smooth and especially level throughout. In subjecting the surface of the plate to the action of a multiplicity of small tools or cutters, in contradistinction to large planing pieces, chisels or the like, the mass of molecules within the plate are more or less set and a surface formed on the plate which will remain true and level as a basis of operations of precision upon pieces of work placed on the plate.

Should one or more of the cutters 16 or the stems 14 thereof be injured or become dull such cutters can be removed, sharpened or renewed without much trouble, and with the planing instrumentality composed of a plurality of heads or drums it is an easy matter to provide a planing instrumentality of proper size for a piece of work.

One embodiment of my invention has been illustrated, but it is to be understood that the structural elements are susceptible to such variations and modifications as fall within the scope of the appended claims.

What I claim is:—

1. A rotary planing instrumentality comprising a driven head, bushings in said head, substantially rigid tool stems extending through said bushing and loosely held thereby for a wobbling and longitudinally shifting movement relative to said head, and tools loosely mounted on the outer ends of said tool stems and held for adjustment to and from said head.

2. A rotary planing instrumentality comprising a plurality of cylindrical heads disposed side by side and adapted to be driven in synchronism, said heads having outwardly flared openings arranged in rows transversely of said head with the openings of one row staggered relative to the openings of adjacent rows, centrifugal distended cutter stems having heads movably seated in the inner ends of said openings with said stems extending through said openings and protruding a considerable distance from the peripheries of said heads, heads on the outer ends of said stems, and bell-shaped cutters loose on said stems and retained thereon by the last mentioned stem heads.

In testimony whereof I affix my signature.

JOHN J. ANDREAS.